(12) United States Patent
Nikolic et al.

(10) Patent No.: US 8,258,482 B2
(45) Date of Patent: Sep. 4, 2012

(54) ENERGY RESOLUTION IN SEMICONDUCTOR GAMMA RADIATION DETECTORS USING HETEROJUNCTIONS AND METHODS OF USE AND PREPARATION THEREOF

(75) Inventors: Rebecca J. Nikolic, Oakland, CA (US); Adam M. Conway, Dublin, CA (US); Art J. Nelson, Trieste (IT); Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 549 days.

(21) Appl. No.: 12/472,081

(22) Filed: May 26, 2009

(65) Prior Publication Data

US 2009/0294680 A1    Dec. 3, 2009

Related U.S. Application Data

(60) Provisional application No. 61/056,788, filed on May 28, 2008.

(51) Int. Cl.
*G01T 1/24* (2006.01)
(52) U.S. Cl. ......... 250/370.14; 250/370.09; 250/370.13; 438/57; 257/E21.002
(58) Field of Classification Search .............. 250/370.09
See application file for complete search history.

(56) References Cited

U.S. PATENT DOCUMENTS

| | | | | |
|---|---|---|---|---|
| 5,136,352 A * | 8/1992 | McIver | ........................ | 257/429 |
| 5,650,337 A * | 7/1997 | Cahen et al. | .................... | 438/22 |
| 6,043,495 A * | 3/2000 | Verger et al. | ............ | 250/370.01 |
| 6,171,643 B1 * | 1/2001 | Polischuk et al. | .............. | 427/76 |
| 6,255,708 B1 * | 7/2001 | Sudharsanan et al. | ........ | 257/428 |
| 7,723,692 B2 * | 5/2010 | Miyake et al. | ........... | 250/370.01 |
| 2006/0289773 A1 * | 12/2006 | Blevis | ...................... | 250/370.09 |
| 2007/0125953 A1 * | 6/2007 | Miyake et al. | ........... | 250/370.01 |
| 2008/0258242 A1 * | 10/2008 | Mei et al. | ....................... | 257/410 |
| 2009/0250692 A1 * | 10/2009 | Szeles et al. | ..................... | 257/42 |

FOREIGN PATENT DOCUMENTS

WO    95/05007    2/1995

OTHER PUBLICATIONS

Rebecca Nikolic, "New Architectures and Materials for Semiconductor Based Radiation Detectors" U.S. Dept. of Energy by Lawrence Livermore National Laboratory under Contract DE-AC52-07NA27344.
R. Nikolic et al., "Pillar Structure Thermal Neutron Detector" U.S. Dept. of Energy by Lawrence Livermore National Laboratory under Contract DE-AC52-07NA27344.

(Continued)

*Primary Examiner* — David Porta
*Assistant Examiner* — Djura Malevic
(74) *Attorney, Agent, or Firm* — Dominic M. Kotab

(57) ABSTRACT

In one embodiment, a system comprises a semiconductor gamma detector material and a hole blocking layer adjacent the gamma detector material, the hole blocking layer resisting passage of holes therethrough. In another embodiment, a system comprises a semiconductor gamma detector material, and an electron blocking layer adjacent the gamma detector material, the electron blocking layer resisting passage of electrons therethrough, wherein the electron blocking layer comprises undoped HgCdTe. In another embodiment, a method comprises forming a hole blocking layer adjacent a semiconductor gamma detector material, the hole blocking layer resisting passage of holes therethrough. Additional systems and methods are also presented.

44 Claims, 7 Drawing Sheets

OTHER PUBLICATIONS

M. Lang et al., "MIS Structures on $Hg_{1-x}Cd_xTe/CdTe/GaAs$ Epulayers" Journal of Crystal Growth 101 (1990) 566-571, North-Holland Elsevier Science Publishers B.V.

Z.C. Feng et al., "Properties of the CdTe/InSb interface studied by optical and surface analytical techniques" 2006 Wiley-VCH Verlag GmII & Co. KGaA, Weinheim.

T.F. Kuech et al., HgTe/CdTe heterojunctions: A lattice-matched Schottky barrier structure Journal of Applied Physics, 53(4); American Institute of Physics, Apr. 1982.

S. Maimon et al., "nBn detector, an infrared detector with reduced dark current and higher operating temperature" Applied Physics Letters 89, American Institute of Physics 2006.

"Lattice Matched Structures for Improved CdZnTe-Based Gamma Detectors" Lawrence Livermore National Laboratory, Dec. 12, 2007.

W.J. Hamilton et al., "HgCdTe/CdZnTe P-I-N High-Energy Photon Detectors" Journal of Electronic Materials, vol. 25, No. 8, 1996.

I.Jung et al, "Direct comparison of the performance of CZT detectors contacted with various metals" Proceedings of SPIE vol. 5922, Bellingham, WA 2005.

* cited by examiner

ENERGY RESOLUTION IN SEMICONDUCTOR GAMMA RADIATION DETECTORS USING HETEROJUNCTIONS AND METHODS OF USE AND PREPARATION THEREOF

RELATED APPLICATIONS

This application claims priority to provisional U.S. application Ser. No. 61/056,788 filed on May 28, 2008, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detectors, and more particularly to systems and methods for improved energy resolution in gamma radiation detectors.

BACKGROUND

The national security of the United States of America (USA), along with many other countries around the globe, is at risk of attack by nuclear and/or radioactive weapons. The USA and international community need detectors to expose these threats at the borders of the nations, airports, and sea ports. The resolution for semiconductor-based gamma radiation detectors is defined as the full width at half max of a peak (FWHM) divided by the energy of the peak. The ideal characteristic for this resolution would be an impulse function. This, however, is not typically the case and the signals can be hard to resolve. For semiconductor-based gamma radiation detectors it is the noise within the detector that is responsible for some of the change from the ideal scenario. Currently, high purity germanium (HPGe) detectors offer possibly the best performance for detecting gamma photons and yield a resolution of about 0.2%. However, because of a narrow energy bandgap (Eg=0.7 eV), HPGe detectors are operated at cryogenic temperatures to operate properly, typically below 110K. This low bandgap value allows a relatively large amount of thermally generated current which degrades the signal to noise ratio in the detector, thus prompting the low temperatures of operation. The cooling requirement of Ge is an encumbrance and a room temperature detector would be greatly preferred, to allow for greater portability, operating efficiency, and ease of use.

At present, the only commercially available room-temperature (Eg=1.6 eV) alternative to cryogenically-cooled germanium detectors is based on Cadmium Zinc Telluride (CdZnTe or CZT), which has a resolution of about 10 times greater than Ge based gamma detectors. High resolution gamma detectors may be used for unambiguous identification of special nuclear materials. FIG. 1 shows an energy spectrum using three different detector materials, Germanium (Ge), Cadmium Zinc Telluride (CZT), and Sodium Iodide (NaI) exposed to 662 keV gamma energy. Only the Ge material is able to resolve the Special Nuclear Material (SNM) signatures with high enough accuracy, as is evidenced by the narrow and tall peaks. NaI resolution is very poor, as can be seen by the lack of distinct peaks. CZT peaks are evident, but to obtain the resolution desired for use in discovering unambiguously special nuclear materials, the peaks should be taller and the width of the peak should be narrower. This sort of peak probably cannot be realized with CZT unless the dark current in the sensor is minimized somehow. Dark current, or leakage current, in a gamma detector is the amount of electrons and/or holes that enter the semiconductor material used to detect gamma radiation from electrodes thereof and travel across the semiconductor material or the amount of electrons and holes thermally generated in the bulk material. Dark current decreases the performance of any gamma detector material. However, improvement in the CdZnTe may result in a detector material that can resolve the SNM signatures in a similar capacity as that of Ge.

Therefore, a CdZnTe-based gamma radiation detector that can operate effectively at or near room temperatures and still provide suitable resolution would be very beneficial.

SUMMARY

In one embodiment, a system comprises a semiconductor gamma detector material and a hole blocking layer adjacent the gamma detector material, the hole blocking layer resisting passage of holes therethrough.

In another embodiment, a system comprises a semiconductor gamma detector material, and an electron blocking layer adjacent the gamma detector material, the electron blocking layer resisting passage of electrons therethrough, wherein the electron blocking layer comprises undoped HgCdTe.

In yet another embodiment, a system comprises a semiconductor gamma detector material, a first electrode adjacent the gamma detector material, an electron blocking layer positioned between the gamma detector material and the first electrode such that the first electrode is not in electrical communication with the gamma detector material except via the electron blocking layer, the electron blocking layer resisting passage of electrons therethrough, a second electrode adjacent the gamma detector material, and a hole blocking layer positioned between the gamma detector material and the second electrode such that the second electrode is not in electrical communication with the gamma detector material except via the hole blocking layer, the hole blocking layer resisting passage of holes therethrough, wherein the blocking layers are lattice matched to the gamma detector material.

In another embodiment, a method comprises forming a hole blocking layer adjacent a semiconductor gamma detector material, the hole blocking layer resisting passage of holes therethrough.

In another embodiment, a method for choosing a barrier material for a gamma detector comprises determining a lattice constant for a semiconductor gamma detector material and a first material to be used as a barrier material, determining if the lattice constant of the semiconductor gamma detector material and the lattice constant of the first material are within about 10% of each other, wherein if the lattice constants of the first material and the semiconductor gamma detector material are within about 10% of each other: determining an energy barrier to electron movement across the first material and across the semiconductor gamma detector material, determining an energy barrier to hole movement across the first material and across the semiconductor gamma detector material, determining if the energy barrier to electron movement across the first material is higher than the energy barrier to electron movement across the semiconductor gamma detector material, wherein if the energy barrier to electron movement across the first material is higher than the energy barrier to electron movement across the semiconductor gamma detector material, the first material is selected as an electron barrier material to be used with the semiconductor gamma detector material in a gamma detector, determining if the energy barrier to hole movement across the first material is higher than the energy barrier to hole movement across the semiconductor gamma detector material, wherein if the energy barrier to hole movement across the first material is higher than the energy barrier to hole movement across the semiconductor gamma detector material, the first material is selected as a hole barrier material to be used with the semiconductor gamma detector material in a gamma detector.

Other aspects and embodiments of the present invention will become apparent from the following detailed description, which, when taken in conjunction with the drawings, illustrate by way of example the principles of the invention.

DETAILED DESCRIPTION

Figure 1:
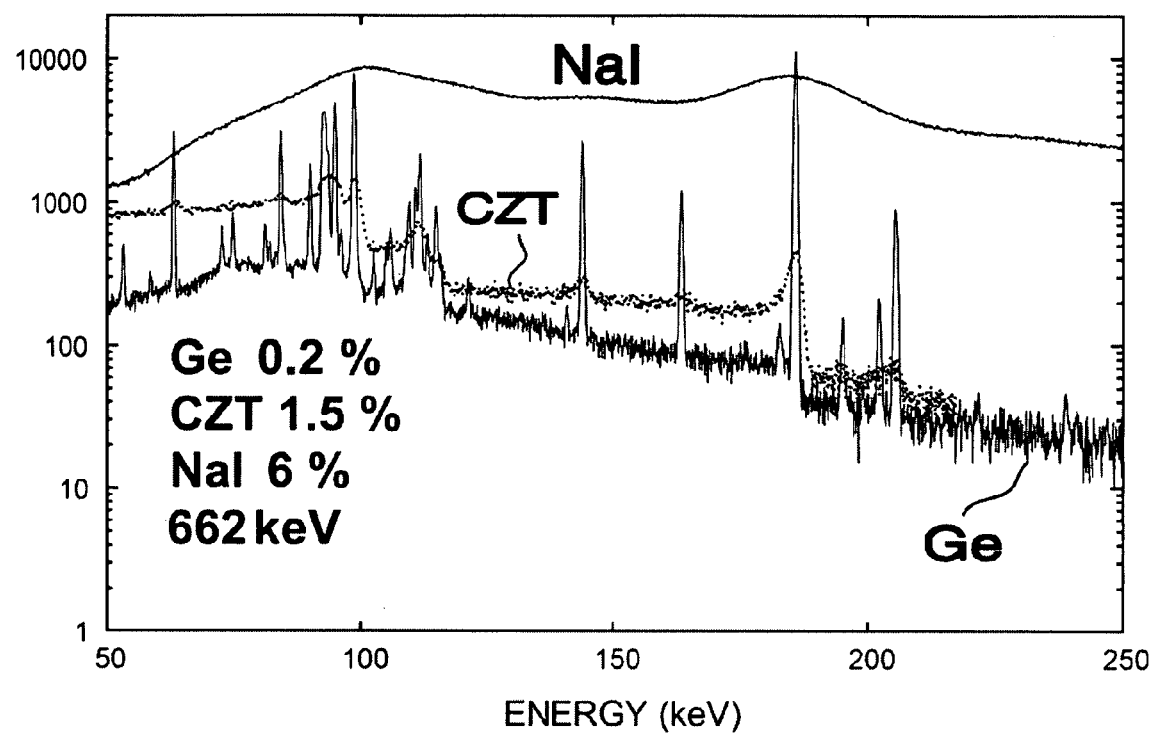
FIG. 1 is a plot of energy resolution for three materials: NaI, CZT, and Ge.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system comprises a semiconductor gamma detector material and a hole blocking layer adjacent the gamma detector material, the hole blocking layer resisting passage of holes therethrough.

In another general embodiment, a system comprises a semiconductor gamma detector material, and an electron blocking layer adjacent the gamma detector material, the electron blocking layer resisting passage of electrons therethrough, wherein the electron blocking layer comprises undoped HgCdTe.

In yet another general embodiment, a system comprises a semiconductor gamma detector material, a first electrode adjacent the gamma detector material, an electron blocking layer positioned between the gamma detector material and the first electrode such that the first electrode is not in electrical communication with the gamma detector material except via the electron blocking layer, the electron blocking layer resisting passage of electrons therethrough, a second electrode adjacent the gamma detector material, and a hole blocking layer positioned between the gamma detector material and the second electrode such that the second electrode is not in electrical communication with the gamma detector material except via the hole blocking layer, the hole blocking layer resisting passage of holes therethrough wherein the blocking layers are lattice matched to the gamma detector material.

In another general embodiment, a method comprises forming a hole blocking layer adjacent a semiconductor gamma detector material, the hole blocking layer resisting passage of holes therethrough.

In another general embodiment, a method for choosing a barrier material for a gamma detector comprises determining a lattice constant for a semiconductor gamma detector material and a first material to be used as a barrier material, determining if the lattice constant of the semiconductor gamma detector material and the lattice constant of the first material are within about 10% of each other, wherein if the lattice constants of the first material and the semiconductor gamma detector material are within about 10% of each other: determining an energy barrier to electron movement across the first material and across the semiconductor gamma detector material, determining an energy barrier to hole movement across the first material and across the semiconductor gamma detector material, determining if the energy barrier to electron movement across the first material is higher than the energy barrier to electron movement across the semiconductor gamma detector material, wherein if the energy barrier to electron movement across the first material is higher than the energy barrier to electron movement across the semiconductor gamma detector material, the first material is selected as an electron barrier material to be used with the semiconductor gamma detector material in a gamma detector, determining if the energy barrier to hole movement across the first material is higher than the energy barrier to hole movement across the semiconductor gamma detector material, wherein if the energy barrier to hole movement across the first material is higher than the energy barrier to hole movement across the semiconductor gamma detector material, the first material is selected as a hole barrier material to be used with the semiconductor gamma detector material in a gamma detector.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

According to some embodiments, there are two approaches that can be taken to improve the resolution of the CdZnTe-based gamma detectors: first, the resistivity of the CdZnTe material can be increased which may reduce the current through the device, and second, the physical layer design of the device may be changed. In one approach, latticed-matched materials that may be grown on CdZnTe detectors may be used to block the leakage current within the device. These lattice-matched materials may be used in a gamma detector system to create high resolution CdZnTe-based gamma detectors.

There are several components to the "noise" which can hinder the resolution of CdZnTe gamma detectors and gamma detectors using other materials as a gamma detector material, including material non-uniformity, recombination of carriers from traps, read out electronics, incomplete charge carrier collection, and/or the leakage current through the device. The dominant component of noise for conventional detectors with ohmic contacts is the leakage current through the device from these contacts, and thus this source of noise is reduced according to embodiments disclosed herein, since this can have some of the greatest impact on improving the performance of gamma radiation detectors.

To overcome the limitations of an ohmic detector structure, effective reverse biased Schottky barrier diodes may be used to block the leakage current, according to some embodiments. Thus, considerably higher electric fields can be applied to increase collection of the created carriers due to the reduced noise. The simplistic thermionic emission theory calculates the reverse bias current density as being dependent on the barrier height between the semiconductor and the metal, according to Equation 1:

$$J_r = -A^* T^2 \exp(-q\Phi_b/kT) \quad \text{Equation 1}$$

where $J_r$ is the emission current density, $A^*$ is the Richardson constant, T is the temperature of the metal, k is the Boltzmann constant, q is the charge on an electron, and $\Phi_b$ is the difference between the work function of the metal and the electron affinity of the semiconductor. However, nature has provided a more complex situation where the barrier height may be reduced due to interface effects between the semiconductor and the metal, which include Fermi level pinning and surface leakage current.

Figure 2:
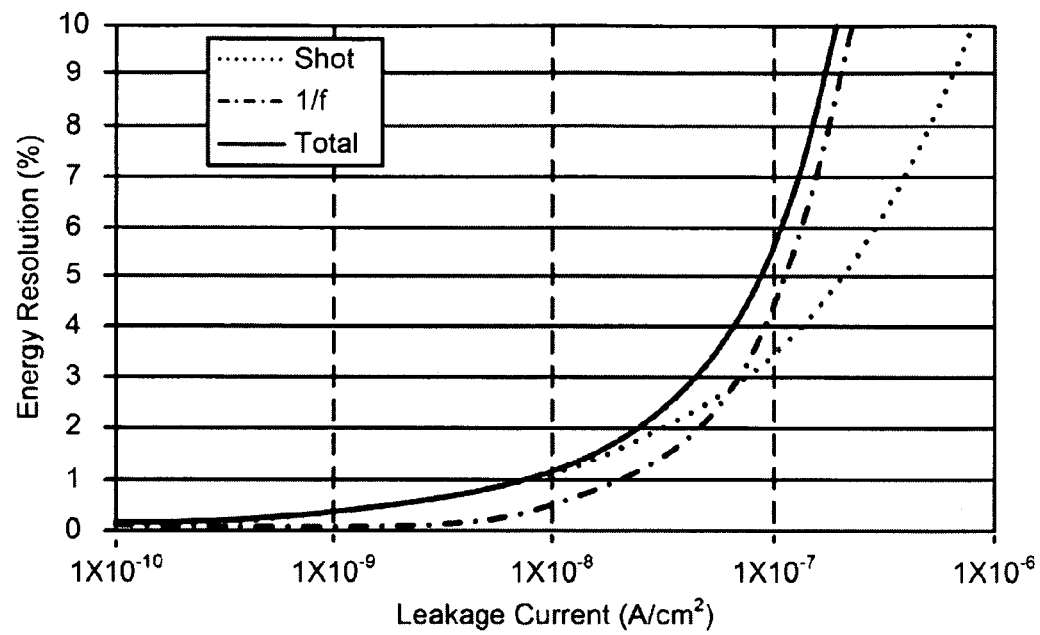
FIG. 2 is a plot of Energy Resolution versus Leakage Current according to one embodiment.

The energy resolution as a function of reverse bias leakage current for contributions of the dominant noise sources (shot and 1/f) in semiconductor radiation detectors is shown in FIG. 2 for a fixed integration time of 1 microsecond. The dominant component that hinders high resolution is the leakage current through the device. Schottky barriers alone are not sufficient to reduce leakage current sufficiently according to calculations from Equation 1 above.

According to some embodiments, to achieve a goal of less than about 1% resolution, the leakage current should be below about 3 nA/cm². According to some novel approaches, in order to accomplish this goal, a multilayered contact structure may be used and intermediate materials may be inserted between the semiconductor and the metal to suppress the surface effects and increase the Schottky barrier height. According to one approach, a lattice-matched semiconductor epitaxial growth may be used on top of CdZnTe crystals to form heterojunctions to substantially block the leakage current but not the signal carrying charged carriers, such as electrons (negatively charged) and holes (positively charged). Epitaxial growth indicates that the deposited film or upper layer takes on the lattice structure of the substrate or lower layer.

Figure 3:
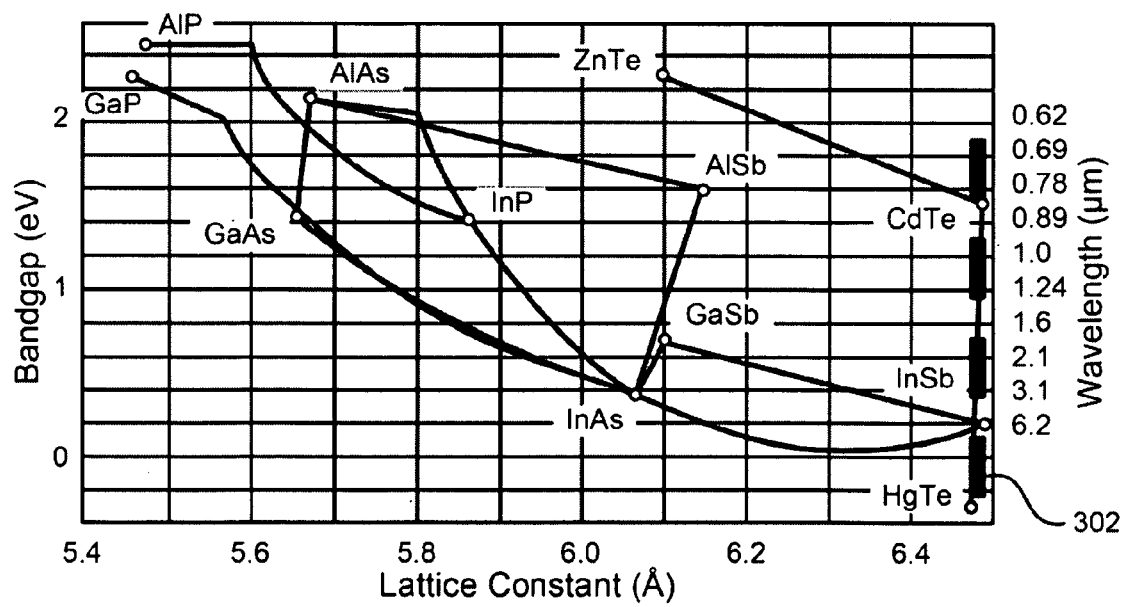
FIG. 3 is a plot of Bandgap versus Lattice Constant for several materials showing a technique for lattice-matching materials according to one embodiment.
Figure 4:
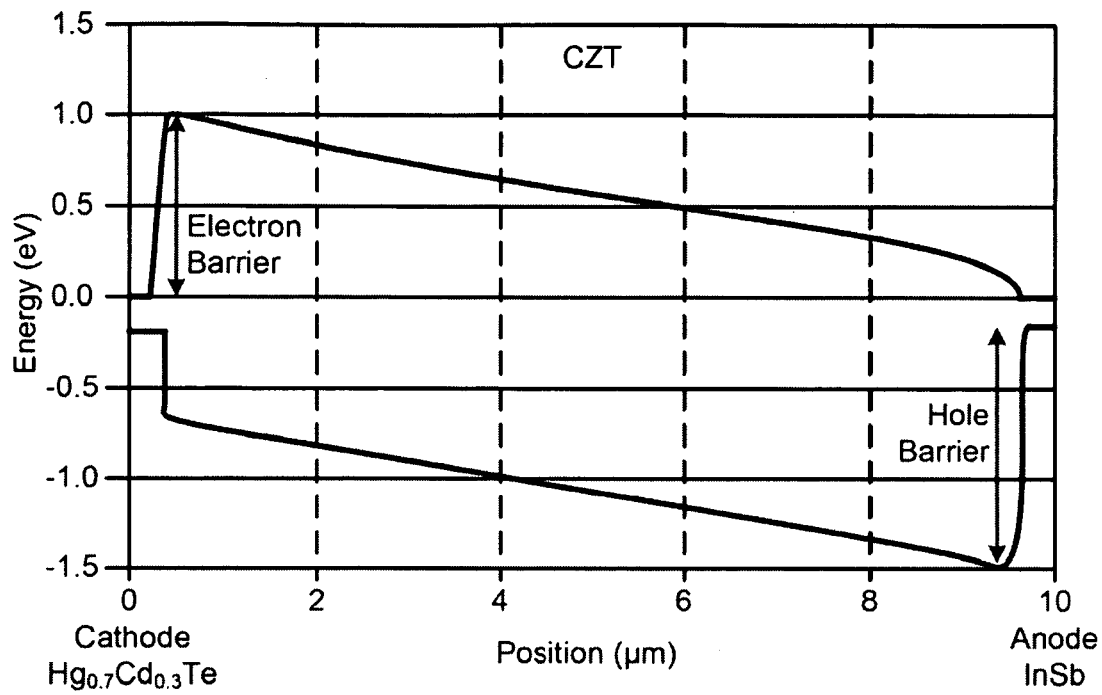
FIG. 4 is plot of the simulated energy band diagram of a structure comprised of InSb and HgCdTe grown in a latticed-matched fashion on CdZnTe (Zn=1%-10%).

FIG. 3 shows the electronic energy bandgap versus lattice constant for various semiconductors. By growing a semiconductor on top of another semiconductor with the same lattice constant, high quality films can be grown, resulting in a heterojunction for reverse bias leakage current reduction, according to some embodiments. In FIG. 3, there is a thick dashed line 302 which indicates that both InSb and HgCdTe can be grown in a latticed-matched fashion on CdZnTe (Zn=1%-10%). A simulated energy band diagram of this structure is shown in FIG. 4.

Figure 5:
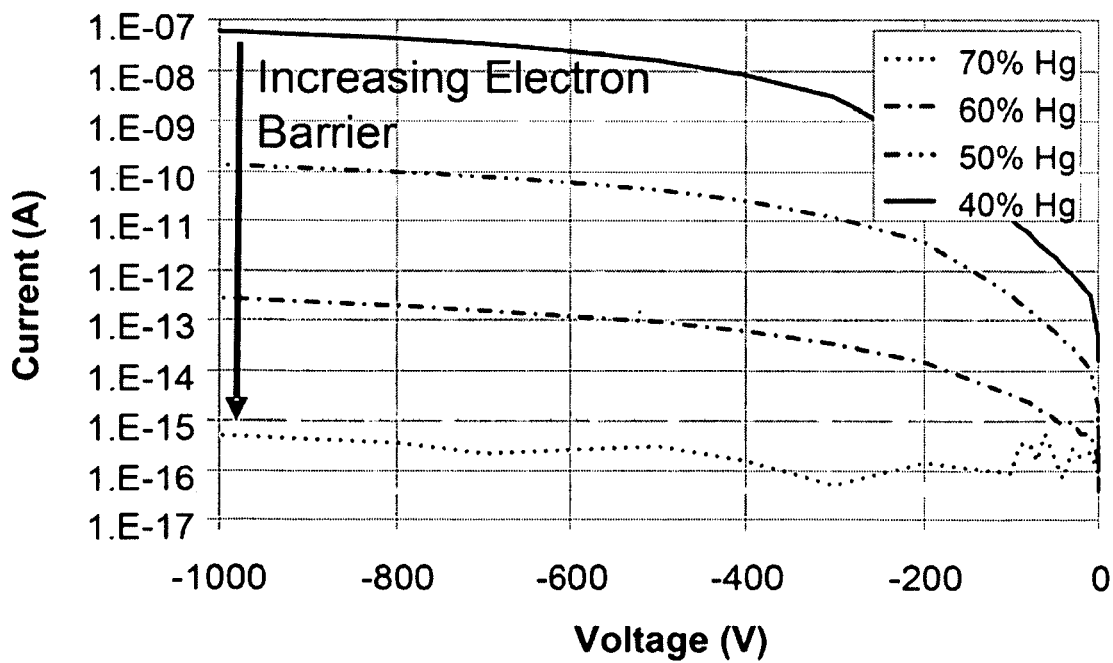
FIG. 5 is a plot showing the relationship between leakage current and energy barriers according to one embodiment.

The leakage current due to electrons originates from the cathode side of the detector but by incorporating HgCdTe, the electrons may be blocked by a 1 eV energy barrier that forms at the heterojunction between CdZnTe and HgCdTe. An analogous situation can be engineered at the anode side of the structure by using InSb on CdZnTe to block the holes. The relationship between leakage current and energy barriers is shown in FIG. 5. FIG. 5 shows that for a 70% Hg composition, the leakage current is reduced by $10^8$ orders of magnitude assuming thermion emission over the barrier.

An added advantage of Schottky contacts may be the application of a higher applied field (E). Since the electron range is given as $\mu\tau E$, where $\mu$ is the mobility and $\tau$ is the carrier lifetime, a higher applied field (E) should be able to improve the carrier collection efficiency and therefore the resolution. Conventional epitaxial crystal growth methods such as molecular beam epitaxy (MBE) and metalorganic chemical vapor deposition (MOCVD) can be used to fabricate the latticed-matched structures. Epitaxial growth indicates that the deposited film or upper layer takes on the lattice structure of the substrate or lower layer.

Figure 6A:
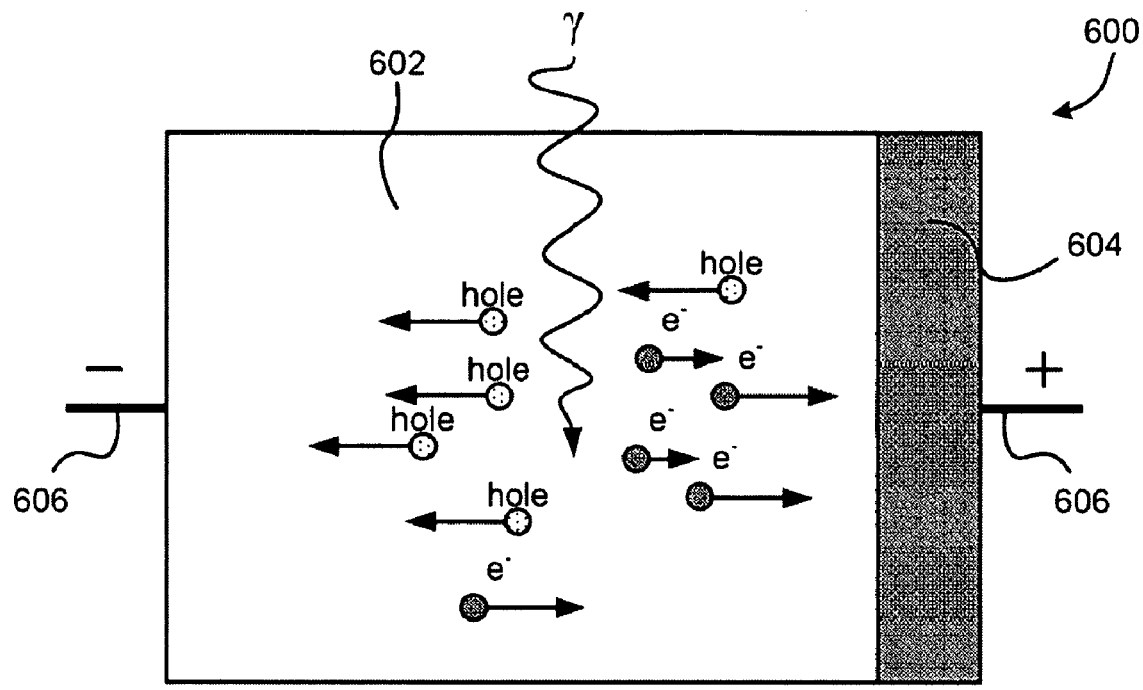
FIG. 6A is a schematic diagram of a system according to one embodiment.

Now referring to FIG. 6A, a system 600 may be described according to one embodiment. The system 600 comprises a semiconductor gamma detector material 602 and a hole blocking layer 604 adjacent the gamma detector material 602. "Adjacent," as used herein, means either directly or indirectly adjacent. The hole blocking layer 604 is designed, selected, developed, formed, etc., to resist passage of holes therethrough. For example, the hole blocking layer 604 blocks more than 25%, preferably more than 50%, even more preferably more than 60%, of the holes that would otherwise pass between the gamma detector material 602 and an electrode 606 if the gamma detector material 602 and the electrode 606 were coupled directly together at room temperature (e.g., 25° C.).

Figure 6B:
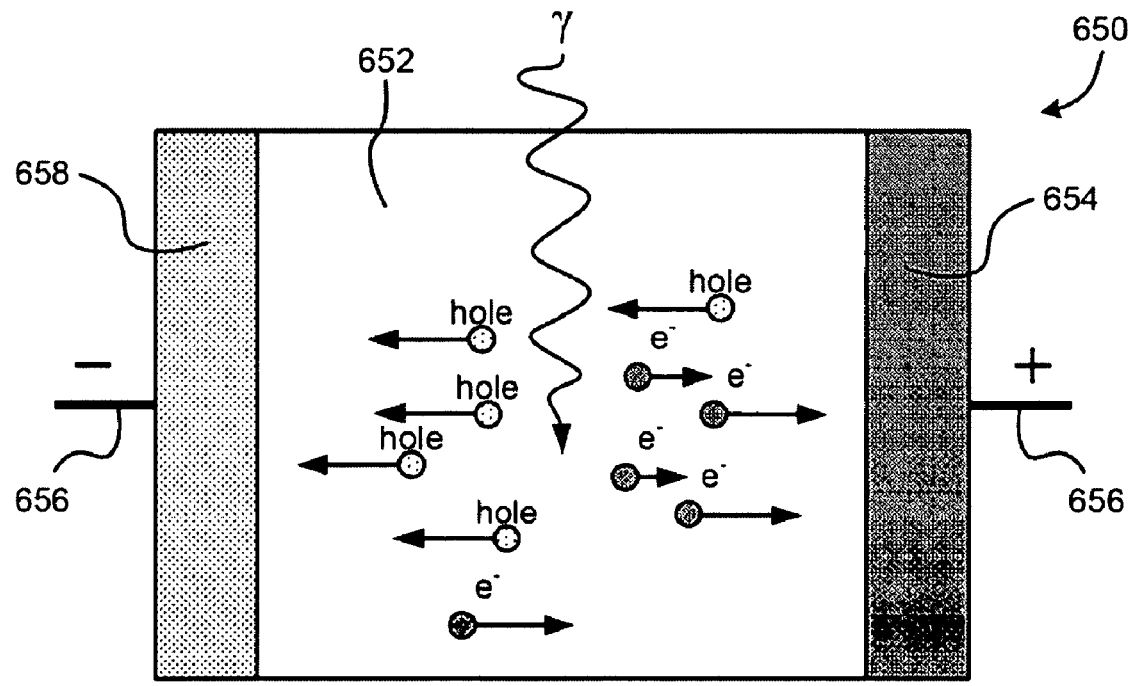
FIG. 6B is a schematic diagram of a system according to one embodiment.
Figure 6C:
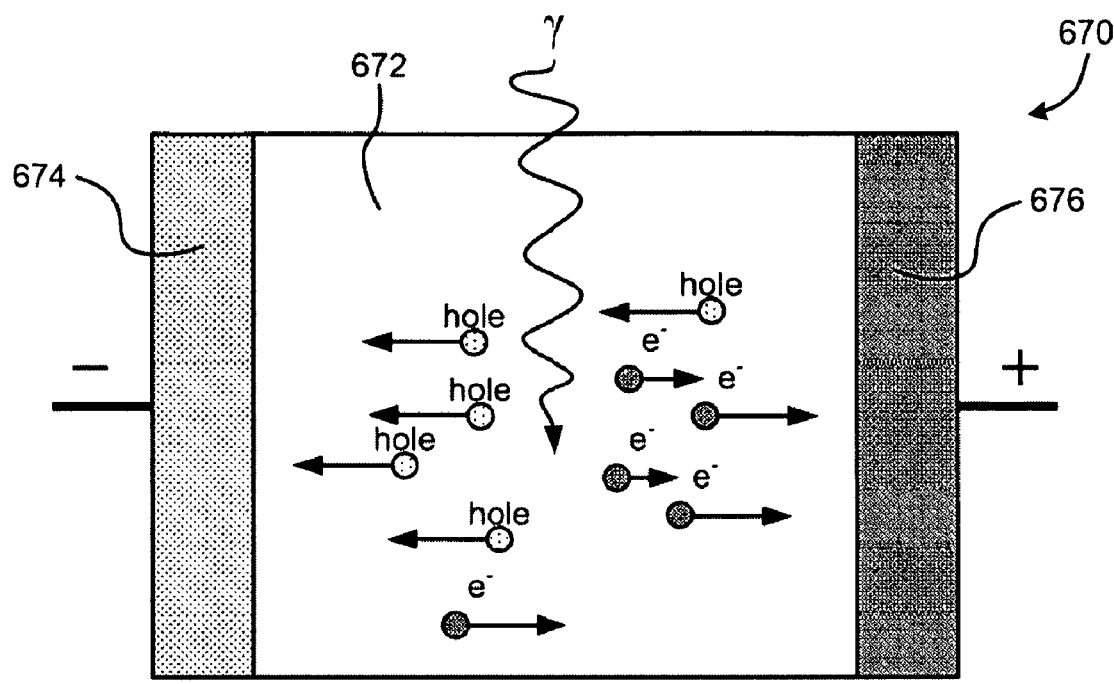
FIG. 6C is a schematic diagram of a system according to one embodiment.
Figure 7:
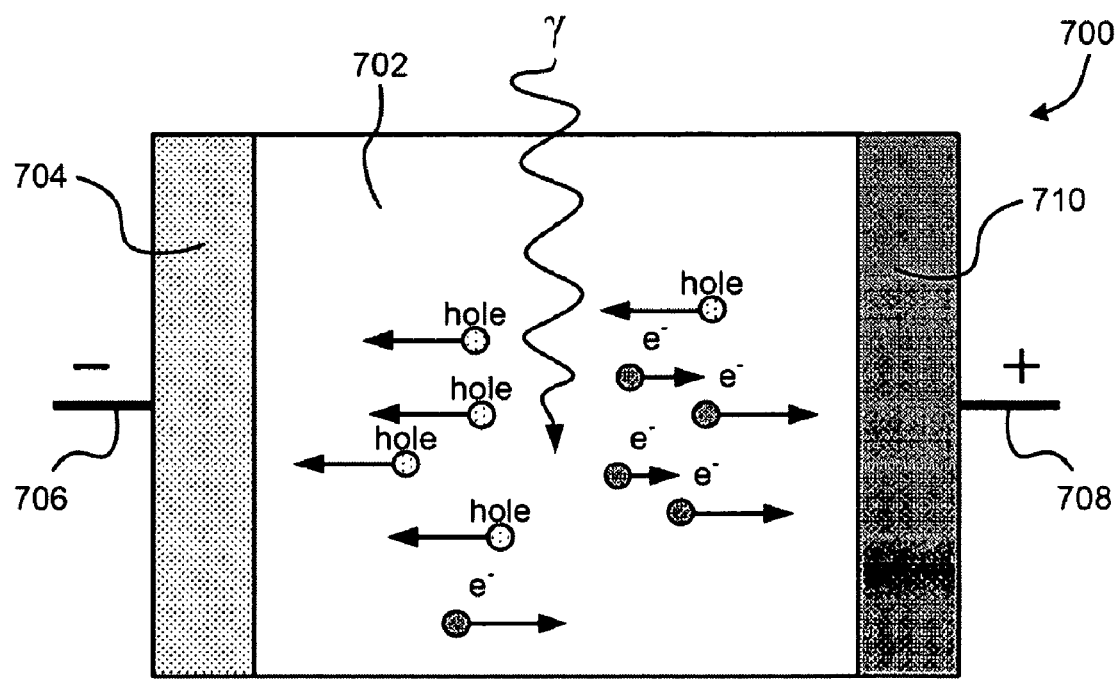
FIG. 7 is a schematic diagram of a system according to one embodiment.

As can be seen in FIG. 6A, and repeated in FIGS. 6B-7, electrons (e⁻) tend to propagate through the gamma detector material toward the positive electrode, if present. Also, holes (hole) tend to propagate through the gamma detector material toward the negative electrode, if present.

An electrode, such as electrode 606, may be a contact point on the structure, e.g., the electrode may be a surface of the blocking layer itself, the electrode may be an electrically conductive pad and/or a layer coupled to the nearest blocking layer (e.g., hole blocking layer 604), etc.

In some approaches, the hole blocking layer 604 may be lattice-matched to the gamma detector material. Lattice-matching may be performed by any technique known in the art, such as determining the lattice constant for each material to be lattice-matched, and then comparing the lattice constants. If the lattice constants are within about 10% of each other, the materials may be determined to be lattice-matched. In more preferred approaches, the lattice constants may be within about 7% of each other, even more preferably within about 5% of each other, and even more preferably within about 2.5% of each other.

Of course, the material which comprises the gamma detector material may be chosen from any material known in the art to be capable of detecting gamma radiation. In some approaches, the semiconductor gamma detector material may be comprised of CdTe, CdZnTe, and/or compositions thereof, with component elements in any ratios. In further approaches, the hole blocking layer 604 may comprise InSb. In more approaches, the hole blocking layer 604 may not significantly resist passage of electrons therethrough, e.g., the hole blocking layer 604 may not block more than about 25% of the electrons that would otherwise pass between the gamma detector material 602 and an electrode 606 if the gamma detector material 602 and the electrode 606 were coupled directly together.

In still more further approaches, a resistivity of the gamma detector material 602 may be less than about $10^{11}$ ohm·cm. Prior to the present invention, it was thought to be impossible to use a CdZnTe gamma detector material having a lower resistivity than about $10^{11}$ ohm·cm. However, by using the unique blocking layer(s) as disclosed herein relaxes the requirement for very high resistivity semiconductor gamma detector materials, according to preferred embodiments. In more preferred approaches, a resistivity of the gamma detector material 602 may be less than about $10^{10}$ ohm·cm, and in even more preferred approaches, less than about $10^{9}$ ohm·cm.

According to even more approaches, hole blocking layer 604 may provide an equivalent Schottky barrier to holes of greater than about 0.8 eV.

Now referring to FIG. 6B, a system 650 may be described according to one embodiment. The system 650 comprises a semiconductor gamma detector material 652, an electron blocking layer 658 adjacent (either directly or indirectly adjacent) the gamma detector material 652, and a hole blocking layer 654 adjacent the gamma detector material 652. "Adjacent," as used herein, means either directly or indirectly adjacent.

The hole blocking layer 654 is designed, selected, developed, and/or formed, etc., to resist passage of holes therethrough. For example, the hole blocking layer 654 blocks more than 25%, preferably more than 50%, even more preferably more than 60%, of the holes that would otherwise pass between the gamma detector material 652 and an electrode 656 if the gamma detector material 652 and the electrode 656 were coupled directly together at room temperature (e.g., 25° C.).

The electron blocking layer 658 resists passage of electrons therethrough. For example, the electron blocking material 658 may block more than about 25%, preferably more than about 50%, of the electrons that would otherwise pass between the gamma detector material 652 and an electrode 656 if the gamma detector material 652 and the electrode 656 were coupled directly together at room temperature (e.g., 25° C.). In some further embodiments, the semiconductor gamma detector material 652 may comprise CdZnTe, wherein the electron blocking layer 658 comprises HgCdTe. Any ratio of Hg to Cd to Te may be used, and in one preferred embodiment, the electron blocking layer 658 comprises $Hg_{0.7}Cd_{0.3}Te$.

An electrode, such as electrode 656, may be a contact point on the structure, e.g., the electrode may be a surface of the blocking layer itself, the electrode may be an electrically conductive pad and/or a layer coupled to the nearest blocking layer (e.g., hole blocking layer 654), etc.

According to some embodiments, the electron blocking layer 658 may not significantly resist passage of holes therethrough, e.g., the electron blocking layer 658 may not block more than about 25% of the holes that would otherwise pass between the gamma detector material 652 and an electrode 656 if the gamma detector material 652 and the electrode 656 were coupled directly together.

According to even more approaches, the electron blocking layer 658 may provide an equivalent Schottky barrier to electrons of greater than about 0.8 eV.

Now referring to FIG. 6C, a system 670 may be described according to one embodiment. The system 670 comprises a semiconductor gamma detector material 672 and an electron blocking layer 674 adjacent (either directly or indirectly adjacent) the gamma detector material 672. The electron blocking layer 674 resists passage of electrons therethrough, and is comprised of undoped (also known as intrinsic) 11 gCdTe, in any ratio of Hg to Cd to Te. In some embodiments, the HgCdTe may comprise at least about 50 atomic % Hg. In one preferred embodiment, the electron blocking layer 674 may comprise $Hg_{0.7}Cd_{0.3}Te$.

In some preferred embodiments, the electron blocking layer 674 may provide an equivalent Schottky barrier to electrons of greater than about 0.8 eV.

In some approaches, the electron blocking layer 674 may be lattice-matched to the gamma detector material 672. Any technique as would be known to one of ordinary skill in the relevant art may be used to lattice-match the electron blocking layer 674 to the gamma detector material 672.

According to some preferred approaches, the semiconductor gamma detector material 672 may comprise CdZnTe, in any ratio of Cd to Zn to Te. In further approaches, a resistivity of the gamma detector material 672 may be less than about $10^{11}$ ohm·cm.

In further approaches, the system 670 may also comprise a hole blocking layer 676 adjacent (either directly or indirectly adjacent) the gamma detector material 672. The hole blocking layer 676 resists passage of holes therethrough. Also, in some embodiments, the semiconductor gamma detector material 672 may comprise CdZnTe, in any ratio of Cd to Zn to Te, and the hole blocking layer 676 may comprise InSb, in any ratio of In to Sb. In addition, in some preferred approaches, the hole blocking layer 676 may provide an equivalent Schottky barrier to holes of greater than about 0.8 eV.

Now referring to FIG. 7, a system 700 may be described according to one embodiment. The system 700 includes a semiconductor gamma detector material 702, a first electrode 706 adjacent the gamma detector material 702, and an electron blocking layer 704 positioned between the gamma detector material 702 and the first electrode 706 such that the first electrode 706 is not in electrical communication with the gamma detector material 702 except via the electron blocking layer 704. The electron blocking layer 704 resists passage of electrons therethrough. The system 700 also includes a second electrode 708 adjacent (either directly or indirectly adjacent) the gamma detector material 702, and a hole blocking layer 710 positioned between the gamma detector material 702 and the second electrode 708 such that the second electrode 708 is not in electrical communication with the gamma detector material 702 except via the hole blocking layer 710. The hole blocking layer 710 resists passage of holes therethrough, and the blocking layers (704 and 710) are lattice-matched to the gamma detector material 702. Any technique as known in the relevant art by one of ordinary skill may be used to lattice-match the blocking layers (704 and 710).

An electrode, such as first electrode 706 and/or second electrode 708, may be a contact point on the structure, e.g., the electrode may be a surface of the blocking layer itself, the electrode may be an electrically conductive pad and/or a layer coupled to the nearest blocking layer (e.g., hole blocking layer 710), etc.

According to some approaches, the semiconductor gamma detector material 702 may comprise CdTe, CdZnTe, and/or combinations thereof, with component elements in any ratio. In further approaches, the hole blocking layer 710 may comprise InSb, in any ratio of In to Sb, and/or the electron blocking layer 704 may comprise HgCdTe, in any ratio of Hg to Cd to Te, such as $Hg_{0.7}Cd_{0.3}Te$.

According to some preferred embodiments, the electron blocking layer 704 may provide an equivalent Schottky barrier to electrons of greater than about 0.8 eV, and the hole blocking layer 710 may provide an equivalent Schottky barrier to holes of greater than about 0.8 eV. Further, a resistivity of the gamma detector material 702 may be less than about $10^{11}$ ohm·cm, more preferably less than about $10^{10}$ ohm·cm, and even more preferably less than about $10^9$ ohm·cm.

With continued reference to FIG. 7, a method may be described according to one embodiment. The method may be performed in any desired environment, and may make use of any of the embodiments described previously in relation to FIGS. 6-7. The method, in its simplest form, includes forming a hole blocking layer (710, FIG. 7) adjacent a semiconductor gamma detector material 702, the hole blocking layer 710 resisting passage of holes therethrough. The semiconductor gamma detector material 702 may comprise CdZnTe, in any ratio of Cd to Zn to Te. In addition, the hole blocking layer 710 may comprise InSb, in any ratio of In to Sb.

In some approaches, the hole blocking layer 710 may be formed by chemical vapor deposition (CVD) or by molecular beam epitaxy (MBE).

According to some embodiments, the method may further include forming an electron blocking layer 704 adjacent the semiconductor gamma detector material 702, the electron blocking layer 704 resisting passage of electrons therethrough. In some further approaches, the semiconductor gamma detector material 702 may comprise CdZnTe, in any ratio of Cd to Zn to Te. In addition, the electron blocking layer 704 may comprise HgCdTe, in any ratio of Hg to Cd to Te, such as $Hg_{0.7}Cd_{0.3}Te$.

Figure 8:
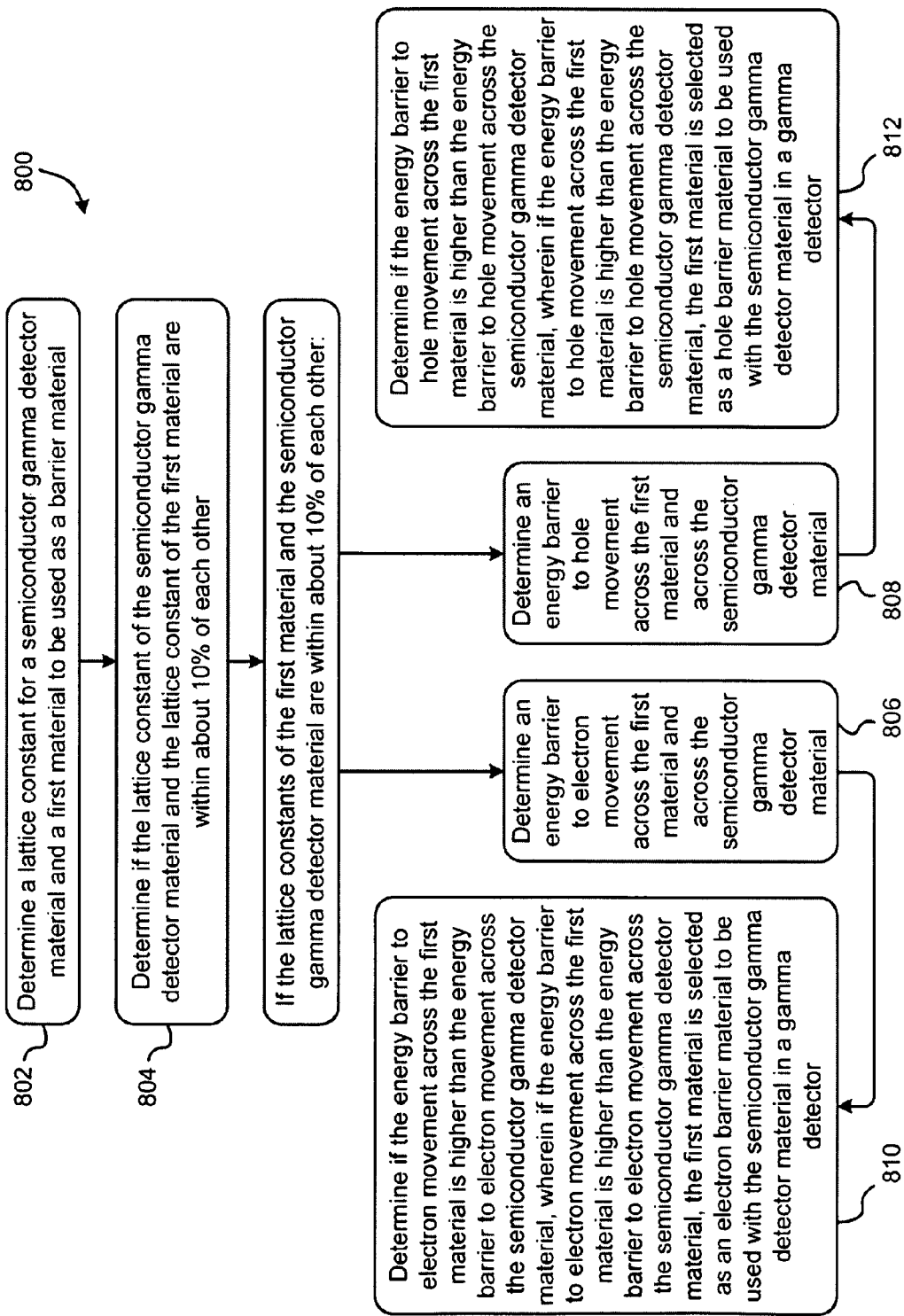
FIG. 8 is a flowchart of a method for choosing a barrier material for a gamma detector according to one embodiment.

Now referring to FIG. 8, a method 800 for choosing a barrier material for a gamma detector may be described according to one embodiment. The method 800 may be carried out in any desired environment, and may be used in conjunction with the other methods and systems described herein.

In operation 802, a lattice constant is determined for a semiconductor gamma detector material and a first material to be used as a barrier material. The prospective barrier material may be chosen to have a lattice constant determined based on an electron and/or hole resisting property of the prospective barrier material. The lattice constant for each material may be determined by any technique known by one of ordinary skill in the relevant art.

In operation 804, it is determined if the lattice constant of the semiconductor gamma detector material and the lattice constant of the first material are within about 10% of each other, in more preferable approaches, within about 5% of each other, even more preferably within about 2.5% of each other.

In operation 806, if the lattice constants of the first material and the semiconductor gamma detector material are within about 10% of each other, an energy barrier to electron movement across the first material and across the semiconductor gamma detector material is determined. Any technique known in the art to determine an energy barrier to electron movement may be used to determine this value for each material, for example: current versus voltage versus temperature measurements, capacitance versus voltage measurements and photoelectron spectroscopy.

In operation 808, if the lattice constants of the first material and the semiconductor gamma detector material are within about 10% of each other, an energy barrier to hole movement across the first material and across the semiconductor gamma detector material is determined. Any technique known in the art to determine an energy barrier to hole movement may be used to determine this value for each material, for example: current versus voltage versus temperature measurements, capacitance versus voltage measurements and photoelectron spectroscopy.

In operation 810, if the lattice constants of the first material and the semiconductor gamma detector material are within about 10% of each other, it is determined if the energy barrier to electron movement across the first material is higher than the energy barrier to electron movement across the semiconductor gamma detector material. If the energy barrier to electron movement across the first material is higher than the energy barrier to electron movement across the semiconductor gamma detector material, the first material is selected as an electron barrier material to be used with the semiconductor gamma detector material in a gamma detector. For example, referring to FIG. 7, the first material may be placed in a system 700 in a position similar to that of electron blocking layer 704.

Referring again to FIG. 8, in operation 812, if the lattice constants of the first material and the semiconductor gamma detector material are within about 10% of each other, it is determined if the energy barrier to hole movement across the first material is higher than the energy barrier to hole movement across the semiconductor gamma detector material. If the energy barrier to hole movement across the first material is higher than the energy barrier to hole movement across the semiconductor gamma detector material, the first material is selected as a hole barrier material to be used with the semiconductor gamma detector material in a gamma detector. For example, referring to FIG. 7, the first material may be placed in a system 700 in a position similar to that of hole blocking layer 710.

Figure 9:
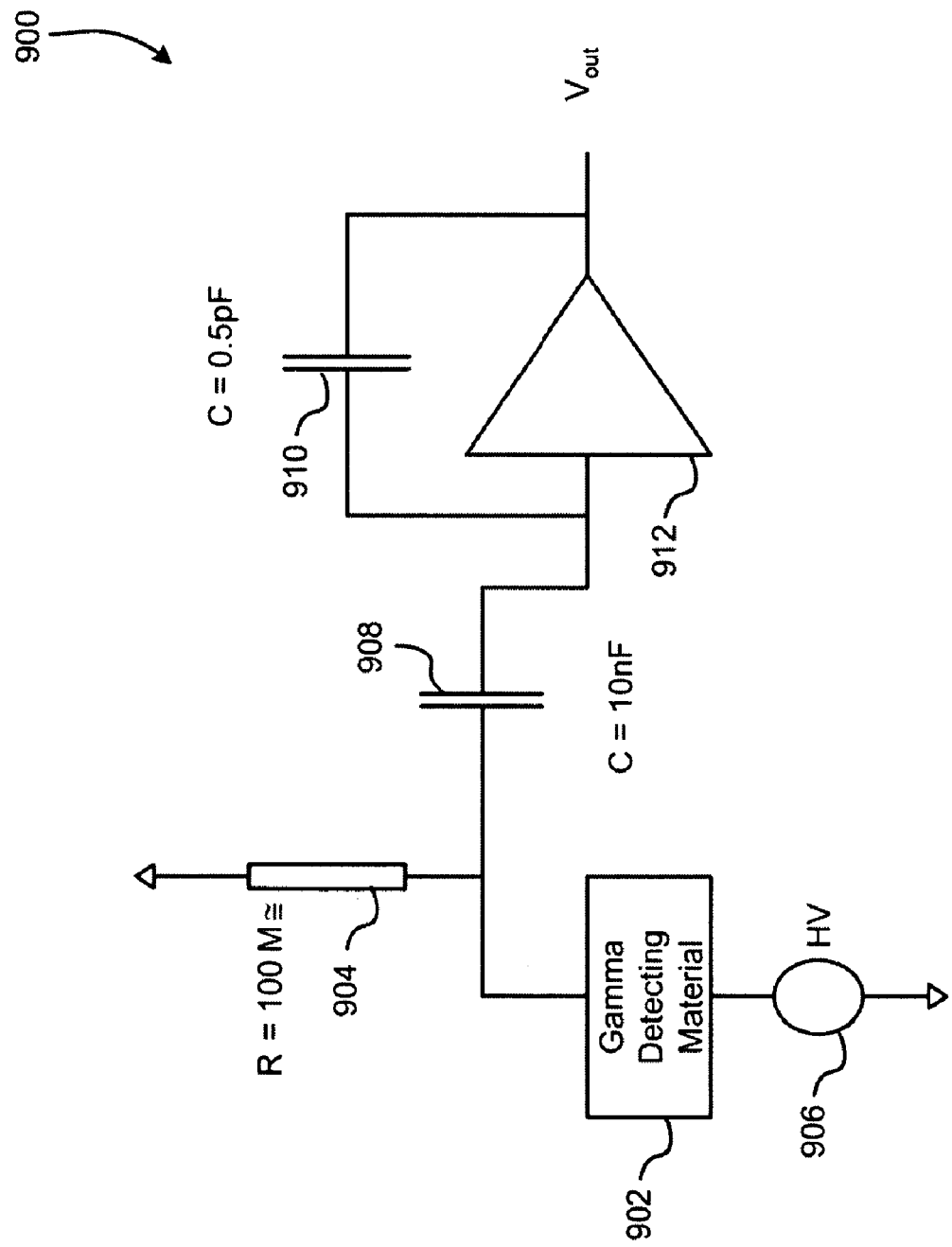
FIG. 9 is a radiation detector measurement circuit according to one embodiment.

With reference to FIG. 9, a radiation detector measurement circuit 900 can be described according to one embodiment. The circuit 900 may be used with any of the methods and/or systems disclosed herein for detecting an amount and/or type of gamma radiation passing through a semiconductor gamma detecting material 902. The semiconductor gamma detecting material 902 may include hole blocking and/or electron blocking layers as described herein. The circuit 900 may include a first voltage source 904, a second voltage source 906 (having a voltage opposite of the first voltage source 904), a first capacitor 908, a second capacitor 910, and an amplifier 912.

The values (e.g., 0.5 pF) indicated in FIG. 9 are according to one embodiment only, and are not meant to limit the values possible for each of the individual elements of the circuit 900 in any way.

The output voltage ($V_{out}$) may be used to characterize the gamma source. This is typically accomplished by feeding the output voltage $V_{out}$ to additional circuitry for processing, manipulating, analyzing, etc.

Many other structures may be used to detect an amount and/or type of gamma radiation, and circuit 900 is meant as an example of one such structure, and is not meant to be limiting in any manner.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A system, comprising:
a semiconductor gamma detector material; and a hole blocking layer adjacent the gamma detector material, the hole blocking layer resisting passage of holes therethrough, wherein the hole blocking layer comprises InSb.

2. The system of claim 1, wherein the hole blocking layer is lattice matched to the gamma detector material.

3. The system of claim 1, wherein the semiconductor gamma detector material comprises CdTe.

4. The system of claim 1, wherein the semiconductor gamma detector material comprises CdZnTe.

5. The system of claim 1, wherein the hole blocking layer is InSb.

6. The system of claim 4, wherein the hole blocking layer does not significantly resist passage of electrons therethrough.

7. The system of claim 4, wherein a resistivity of the gamma detector material is less than about $10^{11}$ ohm cm.

8. The system of claim 4, wherein a resistivity of the gamma detector material is less than about $10^{10}$ ohm cm.

9. The system of claim 1, further comprising an electron blocking layer adjacent the gamma detector material, the electron blocking layer resisting passage of electrons therethrough.

10. The system of claim 9, wherein the semiconductor gamma detector material comprises CdZnTe, wherein the electron blocking layer comprises HgCdTe.

11. The system of claim 9, wherein the electron blocking layer does not significantly resist passage of holes therethrough.

12. The system of claim 9, wherein the electron blocking layer provides an equivalent Schottky barrier to electrons of greater than about 0.8 eV.

13. The system of claim 1, wherein the hole blocking layer provides an equivalent Schottky barrier to holes of greater than about 0.8 eV.

14. A system, comprising:
a semiconductor gamma detector material; and
an electron blocking layer adjacent the gamma detector material, the electron blocking layer resisting passage of electrons therethrough,
wherein the electron blocking layer comprises undoped HgCdTe.

15. The system of claim 14, wherein the electron blocking layer is lattice matched to the gamma detector material.

16. The system of claim 14, wherein the semiconductor gamma detector material comprises CdZnTe.

17. The system of claim 16, wherein a resistivity of the gamma detector material is less than about $10^{11}$ ohm cm.

18. The system of claim 14, wherein the HgCdTe comprises at least about 50 atomic % Hg.

19. The system of claim 14, wherein the electron blocking layer provides an equivalent Schottky barrier to electrons of greater than about 0.8 eV.

20. The system of claim 14, further comprising a hole blocking layer adjacent the gamma detector material, the electron blocking layer resisting passage of holes therethrough.

21. The system of claim 20, wherein the semiconductor gamma detector material comprises CdZnTe, wherein the hole blocking layer comprises InSb.

22. The system of claim 20, wherein the hole blocking layer provides an equivalent Schottky barrier to holes of greater than about 0.8 eV.

23. A system, comprising:
a semiconductor gamma detector material;
a first electrode adjacent the gamma detector material;
an undoped electron blocking layer positioned between the gamma detector material and the first electrode such that the first electrode is not in electrical communication with the gamma detector material except via the electron blocking layer, the electron blocking layer resisting passage of electrons therethrough;
a second electrode adjacent the gamma detector material; and
a hole blocking layer positioned between the gamma detector material and the second electrode such that the second electrode is not in electrical communication with the gamma detector material except via the hole blocking layer, the hole blocking layer resisting passage of holes therethrough,
wherein the blocking layers are lattice matched to the gamma detector material.

24. The system of claim 23, wherein the semiconductor gamma detector material comprises CdTe.

25. The system of claim 23, wherein the semiconductor gamma detector material comprises CdZnTe.

26. The system of claim 25, wherein the hole blocking layer comprises InSb.

27. The system of claim 25, wherein the electron blocking layer comprises HgCdTe.

28. The system of claim 23, wherein the electron blocking layer provides an equivalent Schottky barrier to electrons of greater than about 0.8 eV, wherein the hole blocking layer provides an equivalent Schottky barrier to holes of greater than about 0.8 eV.

29. The system of claim 28, wherein a resistivity of the gamma detector material is less than about $10^{11}$ ohm cm.

30. The system of claim 28, wherein a resistivity of the gamma detector material is less than about $10^{10}$ ohm cm.

31. A method, comprising:
forming a hole blocking layer comprising InSb adjacent a semiconductor gamma detector material, the hole blocking layer resisting passage of holes therethrough.

32. The method of claim 31, wherein the first blocking layer is formed by chemical vapor deposition (CVD).

33. The method of claim 31, wherein the first blocking layer is formed by molecular beam epitaxy (MBE).

34. The method of claim 31, wherein the semiconductor gamma detector material comprises CdZnTe.

35. The method of claim 34, wherein the hole blocking layer is InSb.

36. The method of claim 34, wherein the hole blocking layer does not significantly resist passage of electrons therethrough.

37. The method of claim 34, wherein a resistivity of the gamma detector material is less than about $10^{11}$ ohm cm.

38. The method of claim 31, further comprising forming an electron blocking layer adjacent the semiconductor gamma detector material, the electron blocking layer resisting passage of electrons therethrough.

39. The method of claim 38, wherein the semiconductor gamma detector material comprises CdZnTe, wherein the electron blocking layer comprises HgCdTe.

40. The method of claim 38, wherein the electron blocking layer does not significantly resist passage of holes therethrough.

41. The method of claim 38, wherein the electron blocking layer provides an equivalent Schottky barrier to electrons of greater than about 0.8 eV.

42. The method of claim 31, wherein the hole blocking layer provides an equivalent Schottky barrier to holes of greater than about 0.8 eV.

43. A method for choosing a barrier material for a gamma detector, comprising:
- determining a lattice constant for a semiconductor gamma detector material and a first material to be used as a barrier material;
- determining if the lattice constant of the semiconductor gamma detector material and the lattice constant of the first material are within about 10% of each other,
- wherein if the lattice constants of the first material and the semiconductor gamma detector material are within about 10% of each other:
  - determining an energy barrier to electron movement across the first material and across the semiconductor gamma detector material;
  - determining an energy barrier to hole movement across the first material and across the semiconductor gamma detector material;
  - determining if the energy barrier to electron movement across the first material is higher than the energy barrier to electron movement across the semiconductor gamma detector material, wherein if the energy barrier to electron movement across the first material is higher than the energy barrier to electron movement across the semiconductor gamma detector material, the first material is selected as an electron barrier material to be used with the semiconductor gamma detector material in a gamma detector;
  - determining if the energy barrier to hole movement across the first material is higher than the energy barrier to hole movement across the semiconductor gamma detector material, wherein if the energy barrier to hole movement across the first material is higher than the energy barrier to hole movement across the semiconductor gamma detector material, the first material is selected as a hole barrier material to be used with the semiconductor gamma detector material in a gamma detector.

44. The method of claim 43, wherein the hole blocking layer comprises amorphous Se.

* * * * *